Patented June 7, 1949

2,472,292

UNITED STATES PATENT OFFICE 2,472,292

BENZYLIDENEAMINO COMPOUNDS OF PYRIDINE

Harris L. Friedman, New York, and Leo D. Braitberg, Yonkers, N. Y., assignors to Pyridium Corporation, Yonkers, N. Y., a corporation of New York No Drawing. Application July 27, 1945, Serial No. 607,486

5 Claims. (Cl. 260—296)

Our invention relates to and has for its object, a group of new chemical compounds which are more stable than the original base and hence are useful as intermediates in the production of dyes and other compounds, and some of which have therapeutic properties and are useful for devitalizing bacteria and rendering them harmless or innocuous.

While the basic compounds from which we have formed the new therapeutic compounds of our invention have therapeutic properties, their physical and chemical properties are such as to render their proper application somewhat difficult and they require considerable care in their successful application.

These basic compounds are generally oily liquids, or low melting solids, practically insoluble in water and are somewhat unstable, coloring upon standing, and the decomposition product may be toxic and deleterious, and their acid salts are generally too acid for injection purposes.

One of the objects of our invention, therefore, is to produce new compounds which, while possessing therapeutic properties, will have none of the mentioned, and other disadvantages of the corresponding basic compounds.

We have found that benzylideneamino derivatives of these basic compounds possess highly therapeutic values over those of their corresponding basic compounds.

These therapeutic compounds of our invention are dry, stable powders and hence they can be administered in combination with food, in capsules, in tablet form, or parenterally injected in the form of an oily solution, and they, therefore, possess highly valuable physical, stable and administrative properties over their corresponding basic compounds.

We have found further, that these therapeutic compounds of our invention are particularly valuable in their effectiveness against *Mycobacterium tuberculosis*, although their usefulness is not limited to that particular disease, and that this effectiveness in the treatment of disease is greater than that possessed by the corresponding basic compounds.

We have found, further, that these therapeutic compounds of our invention are less toxic than the corresponding basic compounds, and that they also possess the additional unexpected property of being practically unaffected in their antibacterio action in the presence of such biological inhibitory substances as p-aminobenzoic acid, peptones, serum, pus, etc., which are present in living organisms, which substances seriously reduce the effectiveness of other compounds.

This action of these therapeutic compounds of our invention against *Mycobacterium tuberculosis* is particularly unexpected and remarkable as they are relatively without effect against other pathogenic organisms such as *E. coli.*, *Staphylococcus aureus* and *Streptococcus pyogenes*.

Further, substances which were hitherto known to have activity against *Mycobacterium tuberculosis*, such as certain sulfonamide and related compounds, are greatly, if not completely, inhibited in the presence of biological inhibitory substances, which is known to account for the lack of sufficient tuberculosis activity of those previously known compounds.

Some of the inhibitory substances which are present in the human organism include para-aminobenzoic acid, serum, peptones, pus and other protein degradation products which have high content of inhibitory substances. Some of these inhibitory substances in the lesions of tuberculosis and other diseases, which produce large amounts of tissue breakdown, play a very important role in the inhibition of sulfonamide and sulfone compounds, and as a result of this inhibitory mechanism, therapeutic trials on the whole failed.

The activity of therapeutic compounds of our invention against *Mycobacterium tuberculosis* is not diminished, when p-aminobenzoic acid, peptones, serum, pus, etc., are present. We have found that these compounds of our invention inhibit the growth of various strains of tuberculosis organisms in various dilutions, some diluted as high as one part to 25 million, depending upon the medium and strain of tuberculosis organism used.

As these inhibitory substances are present in the tubercular host, it is impossible to produce the desired therapeutic effect with sulfonamide and sulfone compounds, and hence any compounds which would practically retain their bacteriostatic properties irrespective of the inhibitory substances present would be of the highest value.

This property of the therapeutic compounds included within our invention of being practically uninhibited in bacteriostatic effectiveness, and especially in bacteriostatic effect against *Mycobacterium tuberculosis*, is entirely unexpected and cannot be predicated upon any prior knowledge relative to previously known bacteriostatic compounds, and is of the greatest importance and value in the treatment of infection.

By "inhibitory substances" in our specification and claims, we mean those substances which prevent the bacteriostatic action normally manifested by compounds in their absence, but which do not inhibit the bacteriostatic activities of the therapeutic compounds of our invention.

We have found that when adequate precautions are taken to administer our compounds in such a manner and with such frequency as to insure a desired concentration of the respective compounds in the blood stream, they are effective in the treatment of tuberculosis.

Another advantage of the compounds of our invention is that following administration by whatever route chosen, concentration of the respective compounds in the blood of the recipient animals are higher and can be maintained with greater safety than is possible with the corresponding basic compounds.

The general formula of the compounds of our invention is

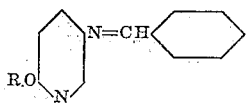

in which R represents a member of the group consisting of alkyl radicals and alkoxy alkyl radicals having not more than eight carbon atoms such as ethyl-, propyl-, butyl-, amyl-, hexyl-, heptyl-, octyl-, isopropyl-, isobutyl-, secondary butyl-, tertiary butyl-, isoamyl-, diethylmethyl-, dipropylmethyl-, allyl-, methoxyethyl-, ethoxyethyl-, and butoxyethyl-, aryl radicals such as phenyl-, naphthyl-, benzyl-, beta-pyridyl-, furfuryl-, p-aminophenyl-, p-aminobenzyl-, cyclohexyl-, tetrahydrofurfuryl-, phenyloxyethyl-, and benzyloxyethyl-.

The general formula for the basic compounds from which we produce the compounds of our invention is:

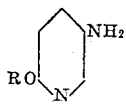

in which R represents a member of the group consisting of alkyl radicals and alkoxy alkyl radicals having not more than eight carbon atoms, and an aryl radical.

The chemical reaction of the process is the following:

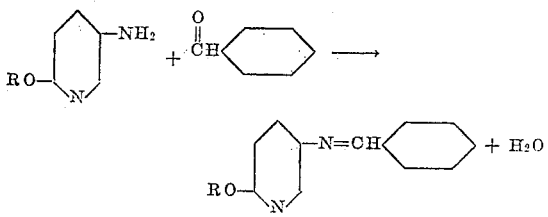

In producing our new compounds we react the free amine with benzaldehyde in equimolecular proportions and recrystallize the resulting product from an alcohol or other indifferent solvent. In place of benzaldehyde other aromatic aldehydes such as cinnamaldehyde and salicylaldehyde can be used without changing the scope of our invention.

The following are examples of our processes for the production of the indicated compounds of our invention.

*Example I*

3.32 cc. of 2-butoxy, 5-aminopyridine were added slowly to 2.12 cc. of benzaldehyde. The mixture was heated up to 40° C. and was kept at that temperature for 15 minutes. Then 3 cc. of ethanol were added. On cooling, the crystalline mass was filtered and recrystallized from 6 cc. of ethanol. The formed compound, 2-butoxy, 5-benzylideneaminopyridine forms rectangular plates. Its melting point is 53.5–54.5° C. and its formula is:

$$C_4H_9O.C_5H_3N.N:CH.C_6H_5$$

*Example II*

2.76 grams of 2-ethoxy, 5-aminopyridine were added to 2.2 cc. of benzaldehyde and heated to about 60° C. for 5 minutes. Then 4 cc. ethanol were added, heated to 80° C., cooled and the crystals collected on a filter. The product 2-ethoxy, 5-benzylideneaminopyridine forms white needles with a melting point of 72–73° C.

*Example III*

4 grams 2-hexyloxy, 5-aminopyridine were reacted with 2.2 cc. of benzaldehyde as in Example I. The melting point of the resulting product, 2-hexyloxy, 5-benzylideneaminopyridine is 150.5°–151° C.

*Example IV*

6.7 grams 2-octyloxy, 5-aminopyridine were reacted with 3.2 grams of benzaldehyde by heating as in the previous examples. The product was recrystallized from methanol and forms thin needles. 2-octyloxy, 5-benzylideneaminopyridine melts at 45–46° C.

*Example V*

3 grams of 2-isomyloxy, 5-aminopyridine were added to 1.8 grams of benzaldehyde and heated to 90° C. for 15 minutes. The resulting product, 2-isoamyloxy, 5-benzylideneaminopyridine was twice recrystallized from isopropanol. Melting point of the product is 49–50° C.

*Example VI*

2 grams 2-allyloxy, 5-aminopyridine were mixed with 1 cc. benzaldehyde and heated on the steam bath, then 2 cc. methanol and 1 cc. water were added. After cooling the entire mixture turns crystalline. The mass was dissolved in 3 cc. isopropyanol by heating, filtered and cooled. The product, 2-allyloxy, 5-benzylideneaminopyridine, crystallized out in lustrous crystals. The melting point is 62.5–63° C.

*Example VII*

3.4 grams 2-methoxyethoxy, 5-aminopyridine were dissolved in 3 cc. isopropanol and added slowly to 2.1 grams benzaldehyde, and heated up to boil. The cooled solution was poured into water, when a yellow oil separated out which solidified on cooling. This was dissolved in methanol and poured into water. After cooling, the crystalline precipitate was collected and recrystallized from petrolether. The melting point of the product, 2-methoxyethoxy, 5-benzylideneaminopyridine is 51–51.5° C.

*Example VIII*

3.72 grams 2-phenyloxy, 5-aminopyridine and 2.12 grams benzaldehyde were mixed together and heated. On cooling, white needles crystallized out, which were recrystallized from methanol. The product formed is 2-phenyloxy, 5-benzylideneaminopyridine. The melting point is 64–65° C.

*Example IX*

3.9 grams 2-tetrahydrofurfuryloxy, 5-aminopyridine were dissolved in 5 cc. isopropanol and slowly added to 2 cc. benzaldehyde. The reaction mixture was boiled up and then cooled in ice water. The crystalline precipitate was collected on a filter and recrystallized from isopropanol. The melting point of the product, 2-tetrahydrofurfuryloxy, 5-benzylideneaminopyridine is at 94–95° C.

The products formed as described in the foregoing examples are similar in their characteristics. They are generally of yellow white crystalline or powder form and are all practically insoluble in water, but soluble in vegetable and mineral oils and in most organic solvents.

The activity of some of the compounds included in our invention against *Mycobacterium tuberculosis* are tabulated below. The figures indicate the highest dilution that still inhibits the growth of *Mycobacterium tuberculosis* under a particular set of experimental conditions as regards inoculum, culture, etc., thereby making a comparable series.

| Name of compound | Highest dilution showing bacteriostasis |
|---|---|
| 2-ethoxy, 5-benzylideneaminopyridine | 1/25,000 |
| 2-butoxy, 5-benzylideneaminopyridine | 1/800,000 |
| 2-isoamyloxy, 5-benzylideneaminopyridine | 1/25,000 |
| 2-hexyloxy, 5-benzylideneaminopyridine | 1/800,000 |
| 2-octyloxy, 5-benzylideneaminopyridine | 1/50,000 |
| 2-allyloxy, 5-benzylideneaminopyridine | 1/200,000 |
| 2-methoxyethoxy, 5-benzylideneaminopyridine | 1/100,000 |
| 2-phenyloxy, 5-benzylideneaminopyridine | 1/25,000 |
| 2-tetrahydrofurfuryloxy, 5-benzylideneaminopyridine | 0 |

The therapeutic compounds of our invention, therefore, present highly valuable and unexpected bacteriostatic properties especially against such bacteria as cause tubercular infections, although their usefulness is not limited to that particular disease.

We do not limit ourselves to the specific limitations mentioned, as these are given solely for the purpose of clearly describing our invention as set forth herein.

What we claim is:

1. Compounds having the general formula:

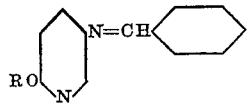

in which R is a member selected from the group consisting of alkyl radicals and alkoxy alkyl radicals having not more than eight carbon atoms and aryl radicals.

2. Compounds having the general formula:

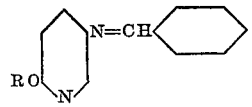

in which R is a member selected from the group consisting of alkyl radicals having not more than eight carbon atoms.

3. Compounds having the general formula:

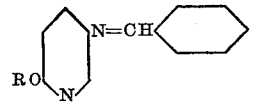

in which R is a member selected from the group consisting of aryl radicals.

4. 2-butoxy, 5-benzylideneaminopyridine.

5. Compounds having the general formula:

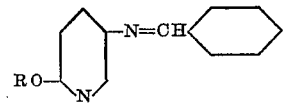

in which R is a member selected from the group consisting of alkoxy alkyl radicals having not more than eight carbon atoms.

HARRIS L. FRIEDMAN.
LEO D. BRAITBERG.

No references cited.